(12) United States Patent
Pan et al.

(10) Patent No.: US 11,916,255 B2
(45) Date of Patent: Feb. 27, 2024

(54) BATTERY AND BATTERY APPARATUS

(71) Applicant: CALB CO., LTD., Jiangsu (CN)

(72) Inventors: Fangfang Pan, Changzhou (CN); Jiuling Xu, Changzhou (CN); Yongjie Zhang, Luoyang (CN); Binwei Qi, Luoyang (CN); Junshan Guan, Luoyang (CN)

(73) Assignee: CALB Co., Ltd., Jiangsu (CN)

( * ) Notice: Subject to any disclaimer, the term of this patent is extended or adjusted under 35 U.S.C. 154(b) by 124 days.

(21) Appl. No.: 17/382,365

(22) Filed: Jul. 22, 2021

(65) Prior Publication Data
US 2022/0367979 A1 Nov. 17, 2022

(30) Foreign Application Priority Data

May 14, 2021 (CN) .......................... 202110528370.2

(51) Int. Cl.
*H01M 50/503* (2021.01)
*H01M 50/209* (2021.01)
*H01M 50/533* (2021.01)
*H01M 50/509* (2021.01)

(52) U.S. Cl.
CPC ....... *H01M 50/503* (2021.01); *H01M 50/209* (2021.01); *H01M 50/509* (2021.01); *H01M 50/533* (2021.01)

(58) Field of Classification Search
CPC ............. H01M 50/503; H01M 50/209; H01M 50/505; H01M 50/507
See application file for complete search history.

(56) References Cited

U.S. PATENT DOCUMENTS

| 2015/0079448 A1* | 3/2015 | Isozaki | H01M 50/548 |
| | | | 429/178 |
| 2020/0083514 A1* | 3/2020 | Enomoto | H01M 50/503 |
| 2020/0317357 A1* | 10/2020 | Demont | H01M 50/358 |

FOREIGN PATENT DOCUMENTS

| EP | 3309856 | 4/2018 | |
| EP | 3309856 A1 * | 4/2018 | ............. H01M 2/02 |
| EP | 3467905 | 4/2019 | |

OTHER PUBLICATIONS

"Search Report of Europe Counterpart Application", dated Dec. 17, 2021, p. 1-p. 8.

* cited by examiner

*Primary Examiner* — Christopher P Domone
*Assistant Examiner* — Jonathan William Estes
(74) *Attorney, Agent, or Firm* — JCIP GLOBAL INC.

(57) ABSTRACT

The disclosure discloses a battery and a battery apparatus. The battery includes two opposite first surfaces and four second surfaces disposed around the first surfaces, a pole assembly and a busbar. An area of the first surface is larger than an area of the second surface. The pole assembly is disposed on the first surface. The busbar is bent into a first segment and a second segment. The first segment is located at a side of the first surface where the pole assembly is disposed and is connected to the pole assembly. The second segment is parallel to or substantially parallel to a second surface and is used for electrically connecting the pole assembly of another battery.

8 Claims, 9 Drawing Sheets

BATTERY AND BATTERY APPARATUS

CROSS-REFERENCE TO RELATED APPLICATION

This application claims the priority benefit of China application serial no. 202110528370.2, filed on May 14, 2021. The entirety of the above-mentioned patent application is hereby incorporated by reference herein and made a part of this specification.

BACKGROUND

Technical Field

The disclosure relates to the technical field of batteries, in particular to a battery and a battery apparatus.

Description of Related Art

The battery in the related art needs to be connected in series and parallel in the packing process. Due to the limitation of battery structure, the connection of poles between batteries in the battery packing process in the related art is extremely inconvenient.

SUMMARY

According to a first aspect of the disclosure, there is provided a battery including: two opposite first surfaces and four second surfaces disposed around the first surfaces, wherein an area of the first surface is larger than an area of the second surface; a pole assembly, wherein the pole assembly is disposed on the first surface; a busbar, wherein the busbar is bent into a first segment and a second segment, the first segment is located at a side of the first surface disposed with the pole assembly and is connected to the pole assembly, and the second segment is parallel to or substantially parallel to one of the second surfaces and is used for electrically connecting a pole assembly of another battery.

According to a second aspect of the disclosure, there is provided a battery apparatus including a first battery and a second battery, the first battery including: two opposite first surfaces and four second surfaces disposed around the first surfaces, wherein an area of the first surface is larger than an area of the second surface; a first pole assembly, wherein the first pole assembly is disposed on the first surface; a first busbar, wherein the first busbar is bent into a first segment and a second segment, the first segment is located at a side of the first surface disposed with the first pole assembly and is connected to the first pole assembly, and the second segment parallel to or substantially parallel to one of the second surfaces; the second battery, including a second pole assembly; and the first battery, disposed side by side with the second battery, such that the second segment is connected to the second pole assembly.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
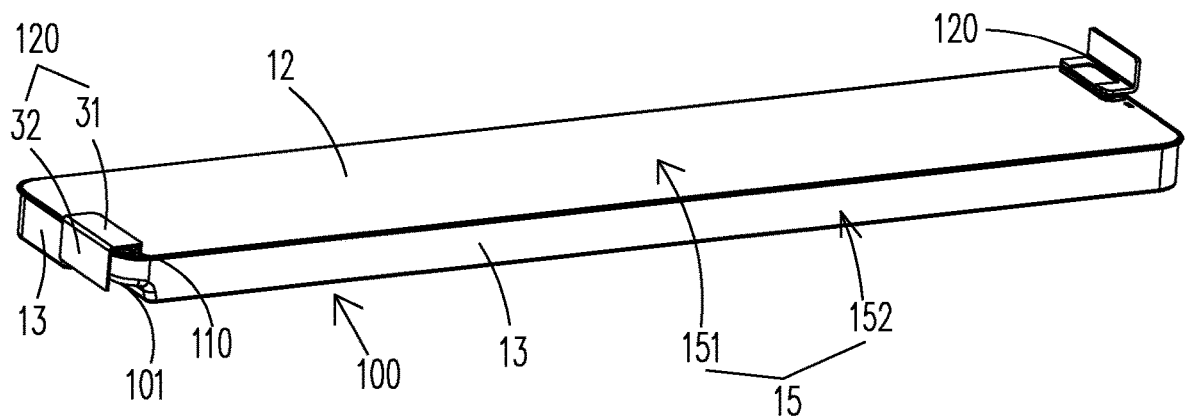
FIG. 1 is a schematic structural diagram of a battery according to an exemplary embodiment.
Figure 2:
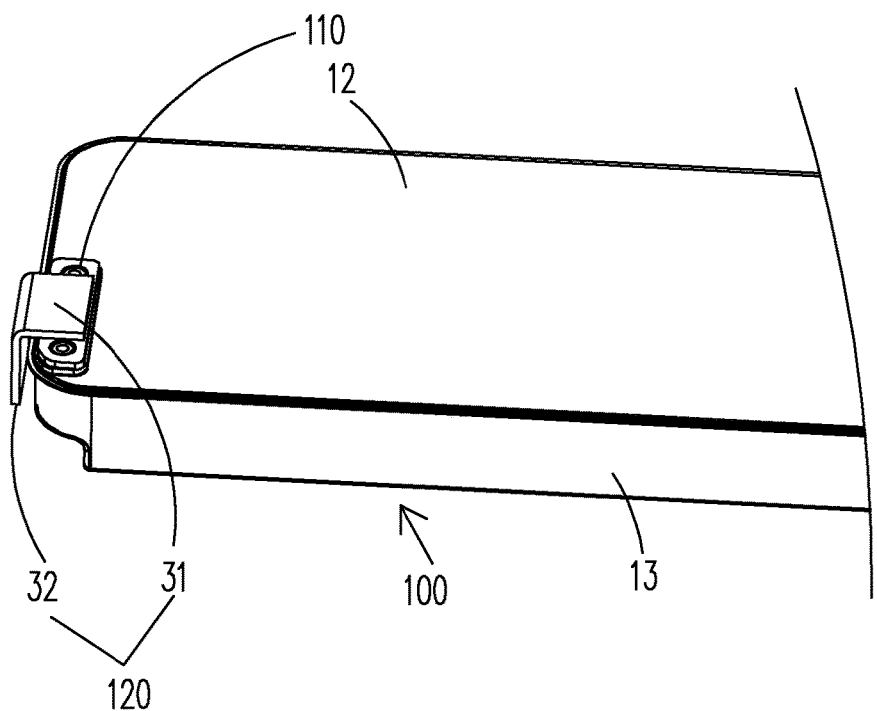
FIG. 2 is a schematic diagram showing a partial structure of a battery according to an exemplary embodiment.
Figure 3:
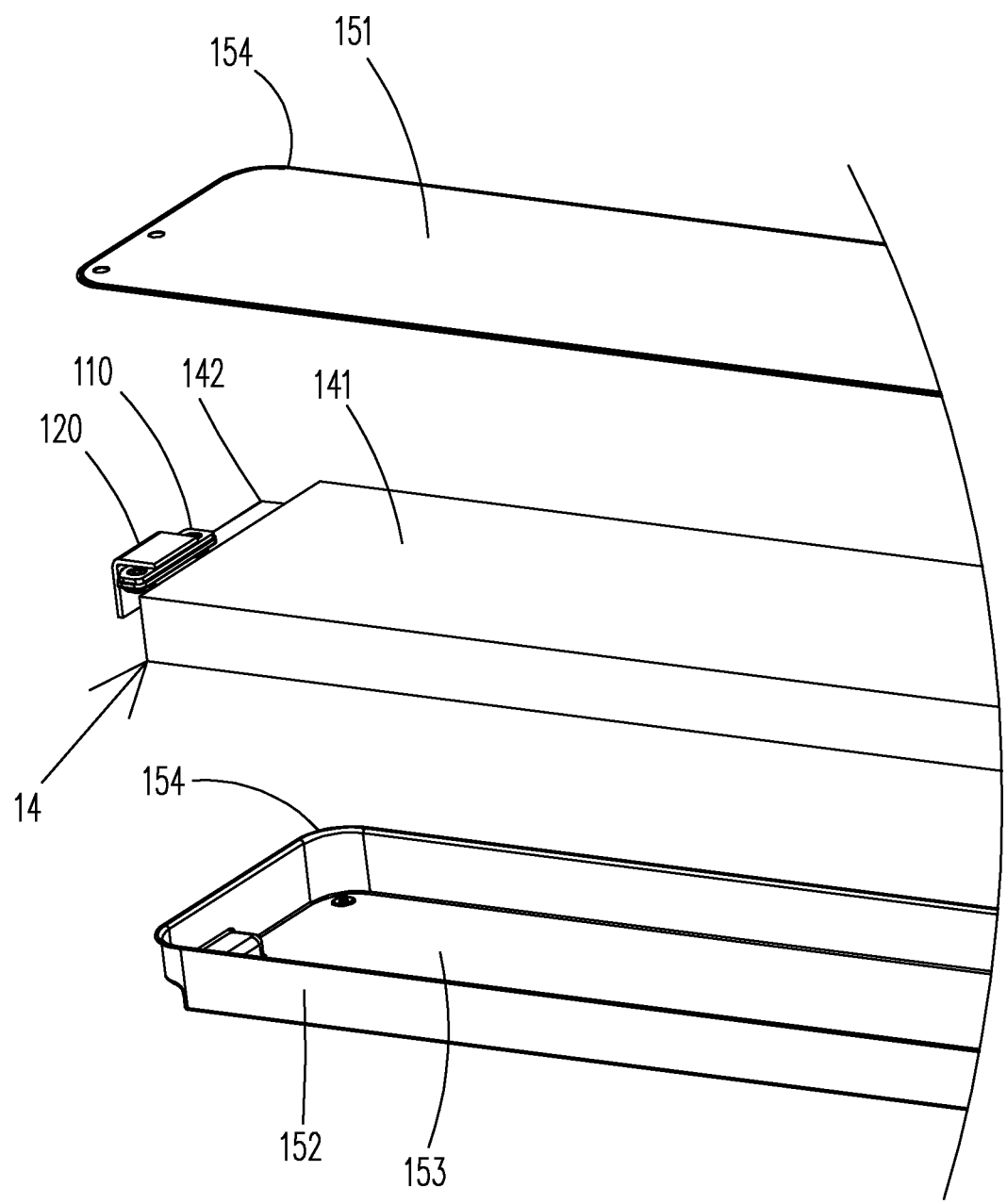
FIG. 3 is a schematic diagram showing a partial exploded structure of a battery according to an exemplary embodiment.

An embodiment of the disclosure provides a battery. Referring to FIGS. 1 to 3, the battery includes: two opposite first surfaces 12 and four second surfaces 13 disposed around the first surfaces 12, an area of the first surface 12 larger than an area of the second surface 13; a pole assembly 110, the pole assembly 110 disposed on the first surface 12; a busbar 120, the busbar 120 bent into a first segment 31 and a second segment 32. The first segment 31 is located at a side of the first surface 12 disposed with the pole assembly 110 and is connected to the pole assembly 110, the second segment 32 is parallel to or substantially parallel to a second surface 13 and is used for electrically connecting a pole assembly of another battery.

The battery of an embodiment of the disclosure includes a pole assembly 110 and a busbar 120. The pole assembly 110 is disposed on the first surface 12 of the battery; that is, the pole assembly 110 is disposed on a large surface of the battery. The first segment 31 of the busbar 120 is connected to the pole assembly 110 and is directly opposite to the first surface 12, and the second segment 32 of the busbar 120 is parallel to or substantially parallel to the second surface 13, so as to facilitate electrical connection with the pole assembly of another battery.

It should be noted that the second segment 32 of the busbar 120 may be connected to the busbar of another battery. In other words, the busbar 120 is electrically connected to the pole assembly of another battery through the busbar of another battery, or the busbar 120 may also be used for connecting other structures, such as cables. Alternatively, the busbar 120 may be directly connected to the pole assembly of another battery.

The battery includes a battery body 100, and the battery body 100 includes two opposite first surfaces 12 and four second surfaces 13 disposed around the first surfaces 12. The battery body 100 has an approximately rectangular structure. In other words, while ignoring processing and manufacturing errors, the battery body 100 may have a rectangular structure.

The two opposite first surfaces 12 are large surfaces of the battery body 100, and the four second surfaces 13 are small surfaces of the battery body 100. The four second surfaces 13 include two pairs of small surfaces, namely a first pair of small surfaces extending along a length direction of the battery body 100, and a second pair of small surfaces extending along a width direction of the battery body 100. An area of the first pair of small surfaces is larger than an area of the second pair of small surfaces, but both are smaller than an area of the large surface. The pole assembly 110 is disposed on the first surface 12 to ensure that the pole assembly 110 has a reliable supporting surface, so as to ensure the stability of the pole assembly 110.

In one embodiment, the orthographic projections of the first segment 31 and the pole assembly 110 on a first surface 12 at least partially overlap. That is, the first segment 31 and the pole assembly 110 may be directly connected, and the connection is extremely convenient.

Optionally, orthographic projections of the first segment 31 and the pole assembly 110 on the first surface 12 do not overlap; that is, the first segment 31 and the pole assembly 110 may be connected by a metal connecting piece.

The second segment 32 and the second surface 13 are parallel or substantially parallel, where the slight parallelism here actually ignores manufacturing errors and the like. The second segment 32 may be parallel to the first pair of small surfaces extending along the length direction of the battery body 100, or the second segment 32 may be parallel to the second pair of small surfaces extending along the width direction of the battery body 100.

Optionally, the first segment 31 and the first surface 12 are parallel or substantially parallel. In other words, when an end of the pole assembly 110 connected with the first segment 31 is parallel to a first surface 12, the first segment 31 and the first surface 12 can be made parallel or substantially parallel, wherein an angle between the first segment 31 and the second segment 32 is a right angle. Of course, in some embodiments, the first segment 31 may be disposed obliquely to the first surface 12, wherein an angle between the first segment 31 and the second segment 32 may be an acute angle or an obtuse angle.

In one embodiment, the first segment 31 and the second segment 32 are substantially perpendicular, so as to ensure the convenient connection of the busbar 120 and that the battery disposition space can be effectively used. If various types of errors are ignored, the first segment 31 and the second segment 32 may be disposed vertically. Optionally, an included angle between the first segment 31 and the second segment 32 may be 80 degrees to 100 degrees. Further, the included angle between the first segment 31 and the second segment 32 may be 85 degrees to 95 degrees.

It should be noted that the fact that the first segment 31 and the second segment 32 are substantially vertical has taken into account of specific process errors. That is, if the processing and manufacturing errors are ignored, the angle formed between the first segment 31 and the second segment 32 is a right angle. Optionally, the included angle between the first segment 31 and the second segment 32 may be 80 degrees to 100 degrees. Further, the included angle between the first segment 31 and the second segment 32 may be 85 degrees to 95 degrees. As shown in FIG. 2, when the first segment 31 transitions to the second segment 32 in an arc-shape, the first segment 31 and the second segment 32 here being substantially vertical is to emphasize the overall extension direction of the two; it is not specifically indicated that there must be a right-angle transition between the first segment 31 and the second segment 32.

In one embodiment, an orthographic projection of the second segment 32 on a plane of the first surface 12 is located outside the first surface 12. In other words, one end of the first segment 31 needs to extend outside of the circumferential outer edge the battery body 100, such that the second segment 32 is not located in a three-dimensional space where the circumferential outer edge of the battery body 100 is located, thereby facilitating subsequent connection.

Optionally, at least part of an orthographic projection of the second segment 32 on a plane where the first surface 12 is located is located inside the first surface 12. In other words, one end of the first segment 31 may not need to extend outside of the circumferential outer edge of another battery body 100, such that the second segment 32 may be located in the three-dimensional space where the circumferential outer edge of the battery body 100 is located. At this time, if the second segment 32 is connected to the pole assembly of another battery, the second segment 32 may directly extend to the pole assembly of the other battery for connection (that is, the pole assemblies of the two batteries may be directly opposite), or the second segment 32 may also be connected to the busbar of another battery.

It should be noted that the busbar 120 is bent toward a direction away from the first surface 12; that is, the busbar 120 increases the occupied space in a height direction of the battery. Alternatively, the busbar 120 is bent toward a direction close to the first surface 12; that is, the busbar 120 does not increase the occupied space in the height direction of the battery.

It should be noted that when the orthographic projection of the second segment 32 on the plane where the first surface 12 is located is outside the first surface 12, no matter toward which direction the busbar 120 is bent, the occupied space in a length direction of the battery will be increased, so as to facilitate the electrical connection between the busbar 120 and external components.

In one embodiment, there are two pole assemblies 110 and two busbars 120. The two busbars 120 are respectively connected to the two pole assemblies 110, such that the two pole assemblies 110 are electrically connected with other components through the two busbars 120.

In one embodiment, as shown in FIG. 1, the two pole assemblies 110 are disposed on the same first surface 12. The busbar 120 on one pole assembly 110 is bent toward a direction away from the first surface 12, and the busbar 120 on the other pole assembly 110 is bent toward a direction close to the first surface 12, so as to facilitate convenient connection of the battery to external components. For example, when the battery is connected in series with another battery, the two busbars 120 may be extended to two sides of the another battery, so as to facilitate the connection.

Optionally, the two pole assemblies 110 may be respectively disposed on the two first surfaces 12.

In one embodiment, the first segment 31 may be welded to the pole assembly 110 so as to ensure the stability of the connection.

In one embodiment, the thickness of the welded portion of the first segment 31 and the pole assembly 110 is smaller than the thickness of the second segment 32, so as to facilitate convenient welding of the first segment 31 and the pole assembly 110. Specifically, it may be understood that portion which the first segment 31 connecting with the pole assembly 10 is thinned, such that the first segment 31 and the pole assembly 110 can be rapidly welded by the welding energy.

It should be noted that the first segment 31 may be partially thinned. Of course, the first segment 31 may be overall thinned.

In one embodiment, the busbar 120 and the pole assembly 110 may be an integrated structure. That is, the busbar 120 and the pole assembly 110 are an integral structure, with relative simple structure and relatively high stability. The integral structure may be multiple independent parts that are fixedly connected after molding. In other words, the busbar 120 and the pole assembly 110 have been connected before the battery assembly, instead of being connected during the battery assembly process. The integral structure may also be an integrally formed structure; that is, the busbar 120 and the pole assembly 110 are integrally formed.

It should be noted that the pole assembly 110 may be disposed protruding from the battery body 100, or may be accommodated in the battery body 100. In other words, a groove may be provided in the battery body 100 for accommodating the pole assembly 110. The pole assembly 110 and the recess 101 may be located on the two first surfaces 12 respectively, or both may be located on the same first surface 12.

In one embodiment, the battery body 100 is provided with a recess 101, so as to accommodate the pole assembly of another battery during battery packing, such that the pole assembly does not occupy the space between the two batteries, and the distance between two adjacent batteries is reduced, thereby increasing the energy density of the battery packing.

It should be noted that the recess 101 on the battery body 100 is used for accommodating the pole assembly of another battery. That is, when two batteries are packed, the pole assembly protruding from the other battery may be accommodated in the recess 101.

In one embodiment, as shown in FIG. 3, the battery body 100 includes: a cell 14, wherein the cell 14 is connected to the pole assembly 110; and a housing 15, wherein the cell 14 is located in the housing 15. The recess 101 and the pole assembly 110 are both disposed on the housing 15, which is not only convenient for assembly but also has a relatively simple structure. The housing 15 may be configured for the assembly of the pole assembly 110.

Optionally, the material of the housing 15 may be stainless steel or aluminum, which has good corrosion resistance and sufficient strength.

In one embodiment, the thickness of the housing 15 is uniform, which not only has strong structural stability, but also facilitates processing.

In one embodiment, as shown in FIGS. 1 and 3, the housing 15 includes: a first housing 151; and a second housing 152, wherein the second housing 152 is connected to the first housing 151 so as to close the cell 14. The first housing 151 and the second housing 152 are disposed separately, which can facilitate the assembly of the cell 14 and convenient processing.

In one embodiment, the recess 101 and the pole assembly 110 may both be disposed on the first housing 151, or the recess 101 and the pole assembly 110 may both be provided on the second housing 152.

In one embodiment, one of the recess 101 and the pole assembly 110 is disposed on the first housing 151, and the other one of the recess 101 and the pole assembly 110 is disposed on the second housing 152, so as to ensure sufficient assembly space and ensure the strength of the structure.

Optionally, the first housing 151 and the second housing 152 may both be formed with an accommodating cavity 153. After the first housing 151 and the second housing 152 are butted, the cell 14 is located in a cavity formed by the two accommodating cavities 153. Depths of the accommodating cavity 153 of the first housing 151 and the second housing 152 may be the same or different; no limitation is imposed here.

Optionally, the first housing 151 is a flat plate. The second housing 152 is formed with an accommodating cavity 153, and the cell 14 is located in the accommodating cavity 153. The disposition of the flat plate may facilitate subsequent connections and is less difficult to process.

Further, a protruding edge 154 is disposed on the circumferential edge of the second housing 152, and the first housing 151 is welded to the protruding edge 154, so as to ensure that the first housing 151 and the second housing 152 are reliably welded, thereby providing a connection stability. The disposition of the protruding edge 154 is mainly to ensure that the welding area is increased, thereby improving the stability of the welding.

Optionally, when the first housing 151 has an accommodating cavity 153, the circumferential edge of the first housing 151 may also be disposed with a protruding edge 154. As shown in FIG. 3, the protruding edge 154 of the first housing 151 is welded to the protruding edge 154 of the second housing 152.

It should be noted that the protruding edge 154 may be understood as a flange, such as a flange formed by extending outward from the circumferential outer edge of a flat plate, or a flange formed by extending outward on a side wall of a structure having an accommodating cavity 153, wherein the flange is substantially perpendicular to the side wall. For the first housing 151 and the second housing 152 being disposed with the protruding edge 154 at the circumferential edges as described in the above-mentioned embodiments, reference may be made to such configuration, such that the protruding edge 154 of the first housing 151 and the protruding edge 154 of the second housing 152 may be directly opposite to each other so as to facilitate connection.

In one embodiment, as shown in FIG. 3, the cell 14 includes a cell main body 141 and a tab 142, and the tab 142 extends from the length direction of the cell main body 141, wherein the tab 142 is connected with the pole assembly 110. At this time, the pole assembly 110 may be disposed at the end of the battery body 100 to facilitate the connection and can fully use the space along the length direction. The tab 142 and the pole assembly 110 may be directly connected; that is, the tab 142 and the pole assembly 110 may be directly welded. Alternatively, the tab 142 and the pole assembly 110 may be connected by a metal adapter piece, and the specific connection method may be welding, or the use of riveting and the like; no limitation is imposed here.

It should be noted that the cell main body 141 includes more than two electrode sheets, and the tab 142 includes more than two single-piece tabs. The single-piece tabs respectively extend from the corresponding electrode sheets, and the width of the single-piece tabs is smaller than the width of the electrode sheet. Multiple single-piece tabs are stacked to form a tab 142, which is connected with the pole assembly 110, wherein the tab 142 may be welded to the pole assembly 110. The single-piece tabs are made of metal foil with good electrical and thermal conductivity, such as aluminum, copper, or nickel.

In some embodiments, there are two pole assemblies 110; the two pole assemblies 110 are respectively a positive pole assembly and a negative pole assembly. There are also two tabs 142, and the two tabs 142 are a positive electrode and a negative electrode respectively. The positive pole assembly is connected with the positive tab, and the negative pole assembly is connected with the negative tab.

It should be noted that the pole assembly 110 and the housing 15 are disposed insulated from each other. For example, an insulating member may be configured for insulation between the two, or an insulating coating may be configured for insulation between the two. The insulation method may be based on actual needs; no limitation is imposed herein.

In one embodiment, a length of the battery is a, wherein 400 mm≤a≤2500 mm; a width of the battery is b, and the height of the battery is c, wherein 2b≤a≤50b and/or 0.5c≤b≤20c.

Further, 50 mm≤b≤200 mm, and 10 mm≤c≤100 mm.

Further, 4b≤a≤25b, and/or 2c≤b≤10c.

In the battery in the above embodiment, under the condition that sufficient energy density is ensured, a ratio of the length to the width of the battery is larger, and further, a ratio of the width to the height of the battery is larger.

In one embodiment, a length of the battery is a, and a width of the battery is b, wherein 4b≤a≤7b. In other words, a ratio of the length to the width of the battery in the present embodiment is larger, thereby increasing the energy density of the battery and facilitating the subsequent formation of the battery module.

In one embodiment, the height of the battery is c, wherein 3c≤b≤7c, and a ratio of the battery width to the height is relatively large, which also ensures formation of the battery module while ensuring sufficient energy density.

Optionally, a length of the battery may be 500 mm-1500 mm, a width of the battery may be 80 mm-150 mm, and a height of the battery may be 15 mm-25 mm.

It should be noted that the length of the battery is a size of the battery in a length direction, the width of the battery is a size of the battery in the width direction, and the height of the battery is a size of the battery in the height direction, namely a thickness of the battery.

In one embodiment, the battery is a laminated battery, which not only is convenient for packing, but also may be processed to obtain a battery of longer length.

Specifically, the cell 14 is a laminated cell. The cell 14 has a first electrode sheet laminated with each other, a second electrode sheet electrically opposite to the first electrode sheet, and a separator film disposed between the first electrode sheet and the second electrode sheet, such that multiple pairs of the first electrode sheet and the second electrode sheet are stacked to form a laminated cell.

Optionally, the battery may be a wound battery. In other words, the first electrode sheet, the second electrode sheet that is electrically opposite to the first electrode sheet, and the separator film disposed between the first electrode sheet and the second electrode sheet are wound, so as to obtain the wound battery.

An embodiment of the disclosure further provides a battery apparatus. Referring to FIGS. 4-7, the battery apparatus includes a first battery 1 and a second battery 2. The first battery 1 includes: two opposite first surfaces 12 and four second surfaces 13 disposed around the first surfaces 12, wherein an area of the first surface 12 is greater than an area of the second surface 13; a first pole assembly 20, wherein the first pole assembly 20 is disposed on the first surface 12; and a first busbar 30, wherein the first busbar 30 is bent into a first segment 31 and a second segment 32, the first segment 31 is located at a side of the first surface 12 where the first pole assembly 20 is disposed and is connected to the first pole assembly 20, and the second segment 32 is parallel to or substantially parallel to a second surface 13. The second battery 2 includes a second pole assembly 50. The first battery 1 and the second battery 2 are disposed side by side, such that the second segment 32 is connected to the second pole assembly 50.

The battery apparatus of an embodiment of the disclosure includes the first battery 1 and the second battery 2. By disposing the first pole assembly 20 of the first battery 1 on the first surface 12, that is, by disposing the first pole assembly 20 on the large surface of the first battery 1, the first segment 31 of the first busbar 30 is connected to the first pole assembly 20 and is directly opposite to the first surface 12, and the second segment 32 of the first busbar 30 and the second surface 13 are parallel or substantially parallel, so as to facilitate electrical connection with the second pole assembly 50 of the second battery 2.

It should be noted that the disposition of the first battery 1 and the second battery 2 side by side means that the first battery 1 and the second battery 2 are packed together, wherein the first battery 1 and the second battery 2 may be stacked up and down, or left and right; no limitation is imposed herein.

It should be noted that the second segment 32 of the first busbar 30 may be directly electrically connected to the second pole assembly 50 of the second battery 2. In other words, the second battery 2 does not need to be disposed with a busbar. For example, the second segment 32 of the first busbar 30 may be directly extended to the second pole assembly 50 for connection. When the first pole assembly 20 and the second pole assembly 50 are directly opposite, the second segment 32 may be directly extended to the second pole assembly 50. In such case, the second segment 32 does not need to be too long for the connection.

Figure 4:
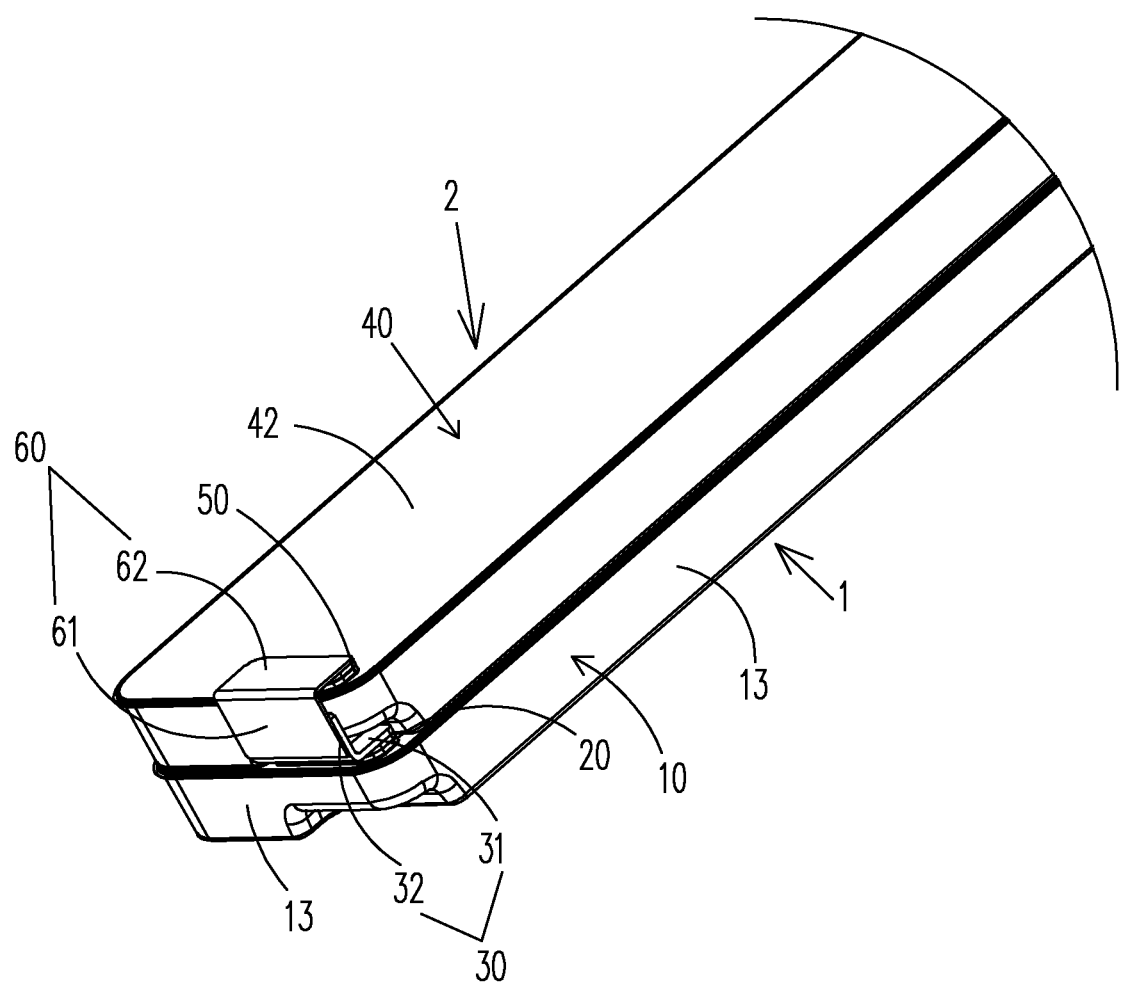
FIG. 4 is a schematic diagram showing a partial structure of a battery apparatus according to an exemplary embodiment.

The first battery 1 includes a first battery body 10, and the first battery body 10 includes two opposite first surfaces 12 and four second surfaces 13 disposed around the first surfaces 12. The second battery 2 includes a second battery body 40, and the second pole assembly 50 is disposed on the second battery body 40. The second battery body 40 includes two opposite third surfaces 42 and four fourth surfaces 43 disposed around the third surfaces 42. In one embodiment, as shown in FIGS. 4 and 5, the second battery 2 further includes a second busbar 60, and the second pole assembly 50 is connected to the second segment 32 through the second busbar 60 to facilitate the connection and facilitate the disposition of components, and effectively using the space of the battery apparatus.

In one embodiment, the second battery 2 includes two opposite third surfaces 42 and four fourth surfaces 43 disposed around the third surfaces 42. An area of the third surface 42 is larger than an area of the fourth surface 43. The second pole assembly 50 is disposed on the third surface 42; that is, the second pole assembly 50 is disposed on the large surface of the second battery 2, so as to ensure that the second pole assembly 50 has a reliable supporting surface, thereby ensuring the stability of the second pole assembly 50.

Figure 5:
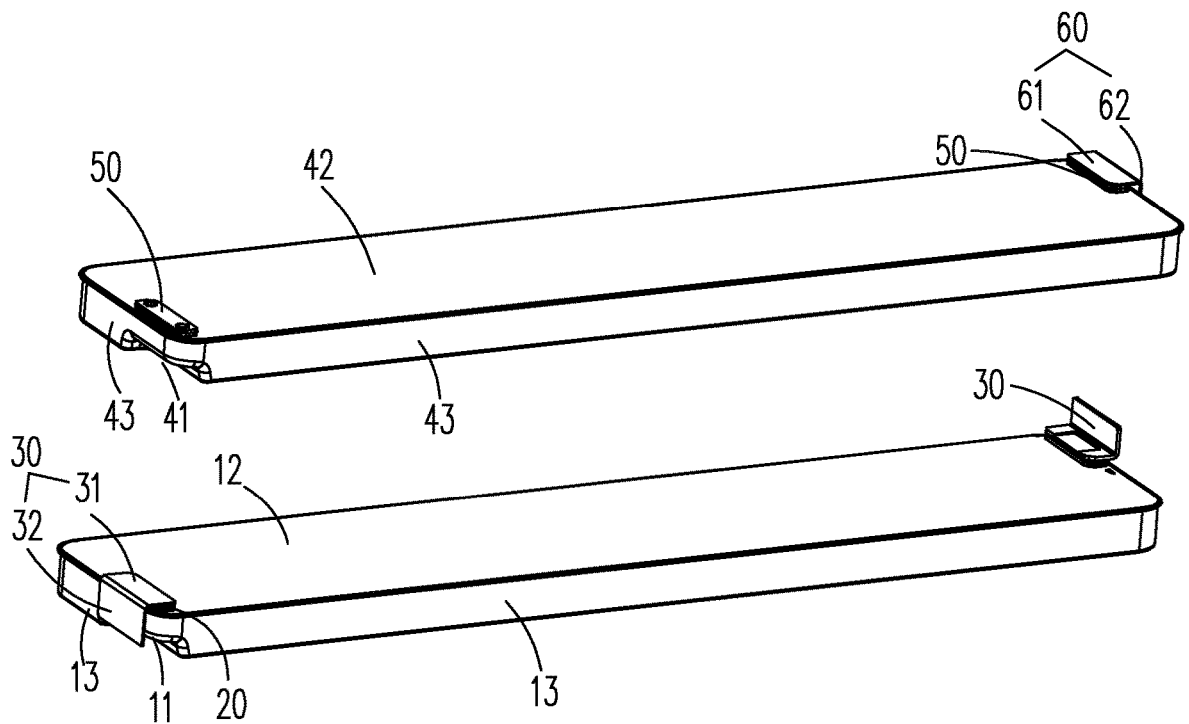
FIG. 5 is a schematic diagram showing an exploded structure of a battery apparatus according to an exemplary embodiment.

Further, as shown in FIG. 5, the second busbar 60 is bent into a third segment 61 and a fourth segment 62. The third segment 61 is located on the side of the third surface 42 where the second pole assembly 50 is disposed, and is connected to the second pole assembly 50. The fourth segment 62 is parallel to or substantially parallel to a fourth surface 43 and is connected to the second segment 32. Both the first busbar 30 and the second busbar 60 are bent to facilitate the connection of the second segment 32 and the fourth segment 62, and facilitate the rapid connection between the second segment 32 and the fourth segment 62.

It should be noted that the first surface 12 of the first battery 1 and the third surface 42 of the second battery 2 are disposed oppositely. In other words, when the first battery 1 and the second battery 2 are packed, the first pole assembly 20 and the second pole assembly 50 may be disposed directly opposite to each other. At this time, the first busbar 30 and the second busbar 60 are directly opposite, and the distance between the second segment 32 and the fourth segment 62 is relatively short.

In one embodiment, the first pole assembly 20 is disposed on one first surface 12 away from the second battery 2, and the second pole assembly 50 is disposed on one third surface 42 close to the first battery 1. In other words, the first battery body 10 is actually clamped between the first pole assembly 20 and the second pole assembly 50.

Optionally, the first pole assembly 20 is disposed on another first surface 12 close to the second battery 2, and the second pole assembly 50 is disposed on another third surface 42 away from the first battery 1. That is, the second battery body 40 is actually clamped between the first pole assembly 20 and the second pole assembly 50.

In the foregoing embodiment, the first pole assembly 20 and the second pole assembly 50 are not directly disposed opposite each other. Such design makes the disposition of the battery apparatus more reasonable, and the distance between the first busbar 30 and the second busbar 60 will not be too great.

Figure 6:
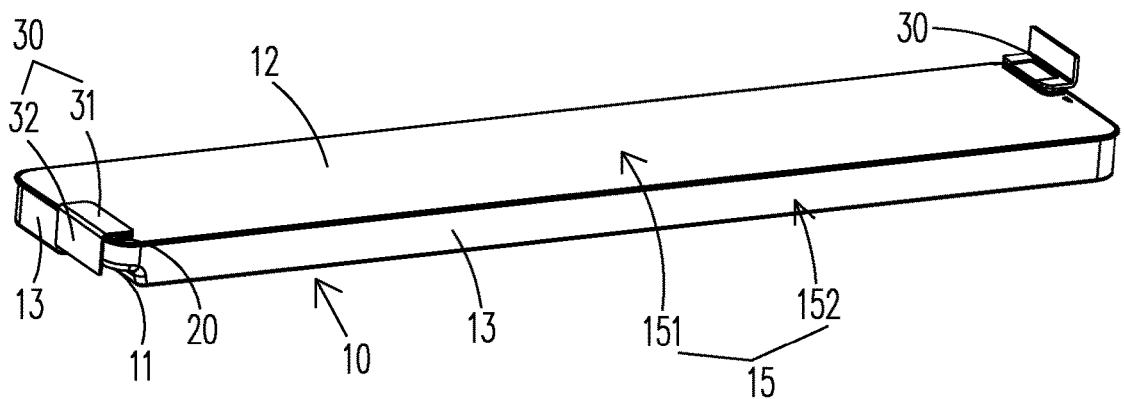
FIG. 6 is a schematic diagram showing a structure of a first battery of a battery apparatus according to an exemplary embodiment.

Further, as shown in FIGS. 5 and 6, a first recess 11 may be provided on the first battery body 10, and the first recess 11 and the first pole assembly 20 may be respectively located on the two first surfaces 12. At this time, the first recess 11 may be used for accommodating the second pole assembly 50 of the second battery 2. The projections of the first recess 11 and the first pole assembly 20 along a direction perpendicular to the first battery body 10 at least partially overlap, such that when the first battery 1 and the second battery 2 are packed, the first battery 1 and the second battery 2 may be aligned with each other, so as to ensure that the second pole assembly 50 may be reliably accommodated in the first recess 11.

Optionally, as shown in FIG. 5, the second battery body 40 may also be provided with a second recess 41 thereon. In such case, the second recess 41 may be used for accommodating a pole assembly of a third battery; no limitation is imposed here. The emphasis is that if the pole assembly of the battery is disposed protruding from the battery body, a recess may be provided on another battery so as to accommodate the adjacent pole assembly, such that the distance between the batteries is minimized, thereby increasing the energy density of the battery apparatus.

In one embodiment, an orthographic projection of the second segment 32 on a plane of the first surface 12 is located outside the first surface 12, and an orthographic projection of the fourth segment 62 on a plane where the third surface 42 is located is outside on the third surface 42. In other words, the second segment 32 and the fourth segment 62 are connected outside the circumferential outer edge of the battery, so as not to occupy the space between the batteries, thereby ensuring the energy density of the battery and facilitating the connection.

Figure 8:
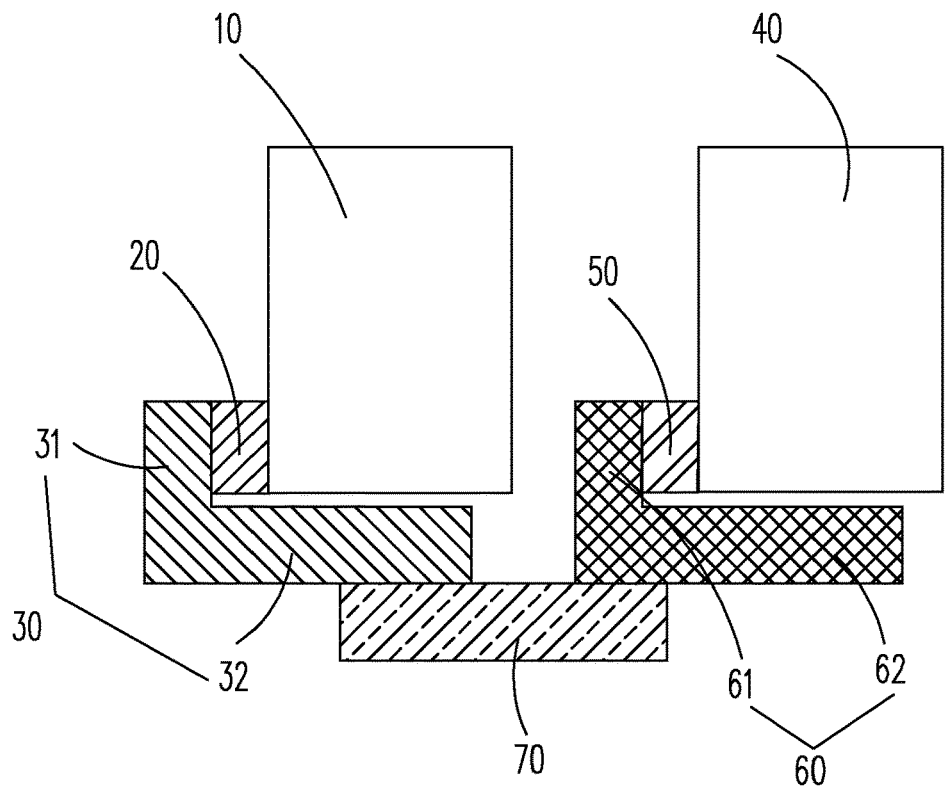
FIG. 8 is a schematic diagram showing a simplified structure of a battery apparatus according to a first exemplary embodiment.
Figure 9:
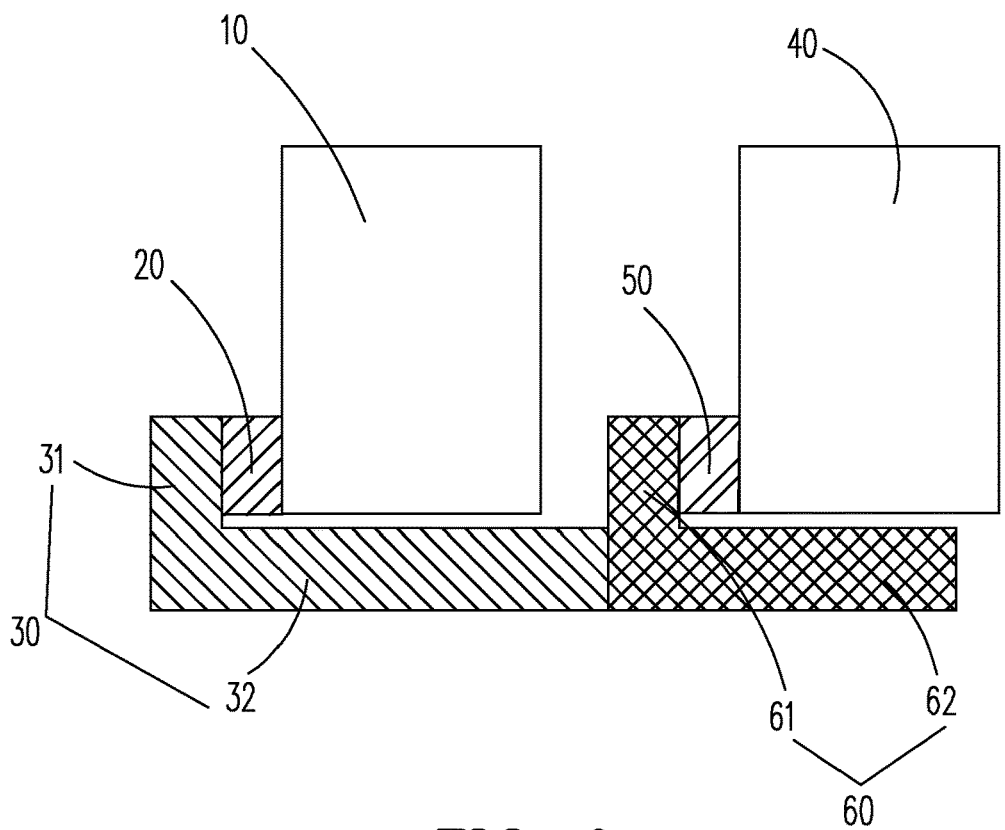
FIG. 9 is a schematic diagram showing a simplified structure of a battery apparatus according to a second exemplary embodiment.

Optionally, the first busbar 30 is bent toward a direction close to the first surface 12, and the second busbar 60 is bent toward a direction close to the third surface 42. The fourth segment 62 and the second segment 32 are connected by an adapter piece 70; that is, the fourth segment 62 is connected with the adapter piece 70, and the second segment 32 is connected with the adapter piece 70, as shown in FIG. 8. Alternatively, the fourth segment 62 and the second segment 32 may be directly welded, as shown in FIG. 9.

Optionally, the first busbar 30 is bent toward a direction away from the first surface 12, and the second busbar 60 is bent toward a direction away from the third surface 42. The fourth segment 62 and the second segment 32 are connected by an adapter piece 70. That is, the fourth segment 62 is connected with the adapter piece 70, and the second segment 32 is connected with the adapter piece 70, as shown in FIG.

Figure 11:
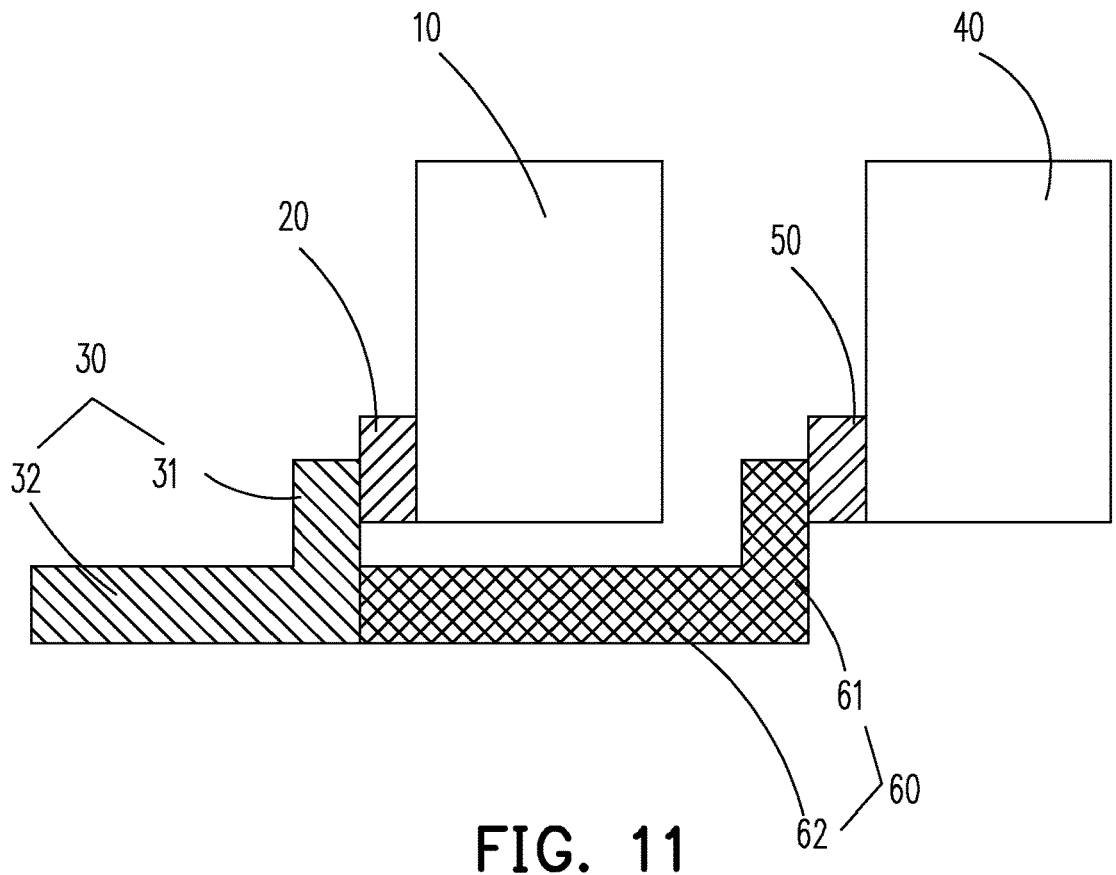
FIG. 11 is a schematic diagram showing a simplified structure of a battery apparatus according to a fourth exemplary embodiment.

10. Alternatively, the fourth segment 62 and the second segment 32 are directly welded, as shown in FIG. 11.

Figure 12:
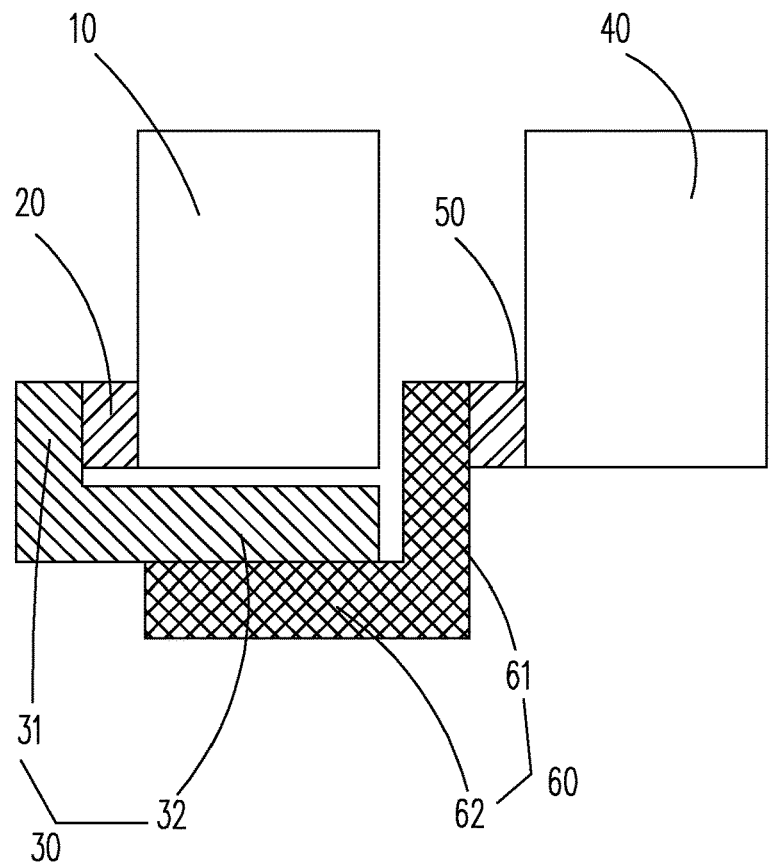
FIG. 12 is a schematic diagram showing a simplified structure of a battery apparatus according to a fifth exemplary embodiment.
Figure 13:
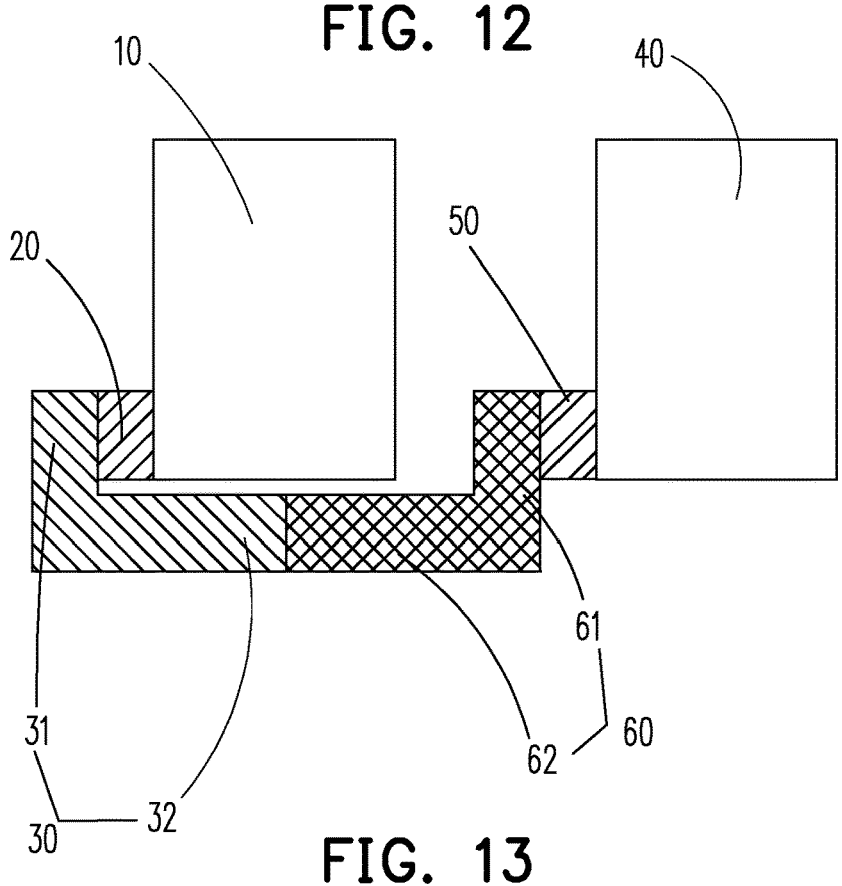
FIG. 13 is a schematic diagram showing a simplified structure of a battery apparatus according to a sixth exemplary embodiment.

Optionally, the first busbar 30 is bent toward a direction close to the first surface 12, and the second busbar 60 is bent toward a direction away from the third surface 42; in other words, the distance between the fourth segment 62 and the second segment 32 reaches the minimum. The fourth segment 62 and the second segment 32 are connected by the adapter piece 70; that is, the fourth segment 62 is connected with the adapter piece 70, and the second segment 32 is connected with the adapter piece 70. Alternatively, the fourth segment 62 and the second segment 32 are directly welded. As shown in FIG. 12, the fourth segment 62 and the second segment 32 may also be disposed overlapped. Alternatively, the fourth segment 62 and the second segment 32 may be directly butted; that is, the end face of the fourth segment 62 and the end face of the second segment 32 are directly butted, as shown in FIG. 13, and the first busbar 30 and the second busbar 60 form a U-shaped structure.

Optionally, the first busbar 30 is bent toward a direction away from the first surface 12, and the second busbar 60 is bent toward a direction close to the third surface 42; in other words, the distance between the fourth segment 62 and the second segment 32 reaches the maximum. The fourth segment 62 and the second segment 32 are connected by the adapter piece 70; that is, the fourth segment 62 is connected with the adapter piece 70, and the second segment 32 is connected with the adapter piece 70.

It should be noted that the connection mode of the fourth segment 62 and the second segment 32 is not limited here, and may be selected according to actual needs. In the selection of the adapter piece 70, the adapter piece 70 is a metal piece, which is not only easy to weld, but also the reliability of welding is strong.

It should be noted that for the connection of the fourth segment 62 and the second segment 32, the fourth segment 62 and the second segment 32 may be directly butted. Of course, the fourth segment 62 and the second segment 32 may also be disposed overlapped; no limitation is imposed herein.

In one embodiment, the fourth segment 62 and the second segment 32 are disposed overlapped, and the fourth segment 62 is located outside the second segment 32. A thickness of a welded portion of the fourth segment 62 and the second segment 32 is smaller than a thickness of the third segment 61, or a thickness of the second busbar 60 is smaller than a thickness of the first busbar 30, so as to facilitate convenient welding between the fourth segment 62 and the second segment 32. Specifically, it may be understood that portion which the fourth segment 62 connecting with the second segment 32 is thinned, such that the fourth segment 62 and the second segment 32 can be rapidly welded by the welding energy.

Figure 14:
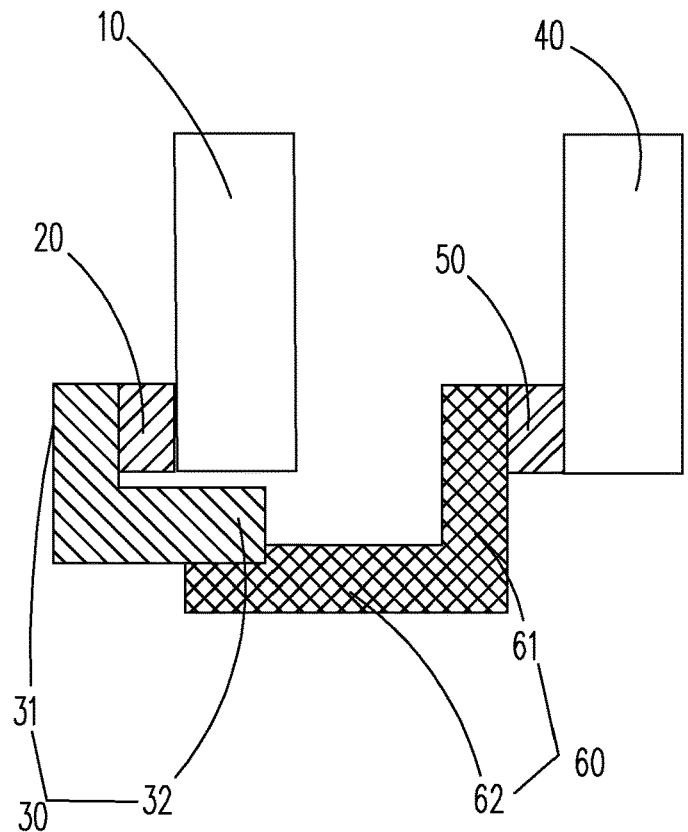
FIG. 14 is a schematic diagram showing a simplified structure of a battery apparatus according to a seventh exemplary embodiment.
Figure 15:
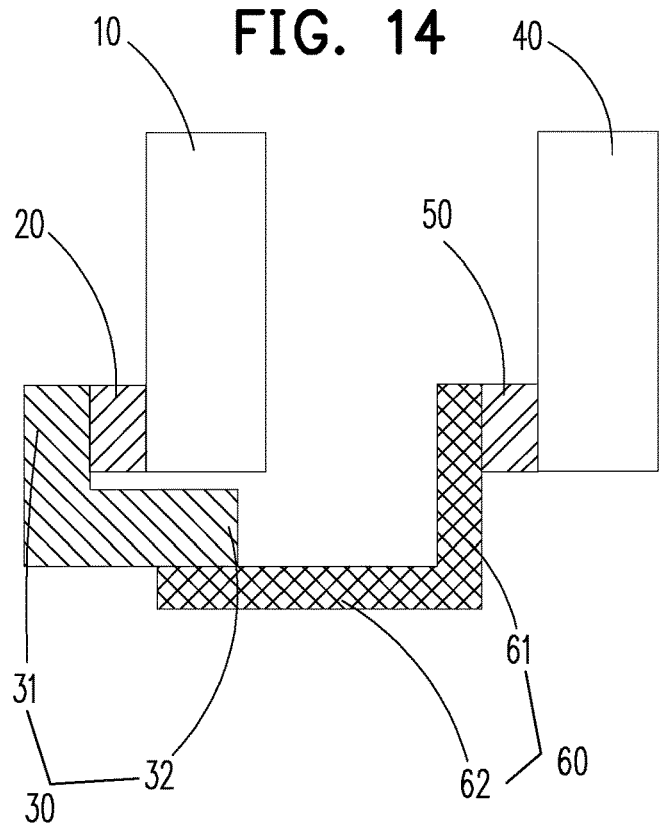
FIG. 15 is a schematic diagram showing a simplified structure of a battery apparatus according to an eighth exemplary embodiment.

It should be noted that the second busbar 60 may partially thin only the fourth segment 62, as shown in FIG. 15. Of course, the fourth segment 62 may also be overall thinned. Needless to say, an overall thickness of the second busbar 60 may be smaller than the thickness of the first busbar 30, which is similar to the overall thinning of the second busbar 60, as shown in FIG. 14.

Optionally, the fourth segment 62 and the second segment 32 are disposed overlapped, and the fourth segment 62 is located inside the second segment 32. A thickness of a welded portion between the second segment 32 and the fourth segment 62 is smaller than the thickness of the first segment 31, or a thickness of the first busbar 30 is smaller than the thickness of the second busbar 60, so as to facilitate convenient welding between the second segment 32 and the fourth segment 62. Specifically, it may be understood that portion which the fourth segment 62 connecting with the second segment 32 is thinned, such that the second segment 32 and the fourth segment 62 can be rapidly welded by the welding energy.

It should be noted that the first busbar 30 may partially thin only the second segment 32. Of course, the second segment 32 may also be overall thinned. Needless to say, an overall thickness of the first busbar 30 may be smaller than the thickness of the second busbar 60, which is similar to the overall thinning of the first busbar 30.

Optionally, the first battery body 10 has an approximately rectangular structure. In other words, while ignoring processing and manufacturing errors, the first battery body 10 may have a rectangular structure. Correspondingly, the second battery body 40 has an approximately rectangular structure.

There are two first pole assemblies 20 and two first busbars 30, and the two first busbars 30 are respectively connected to the two first pole assemblies 20. There are two second pole assemblies 50 and two second busbars 60, and the two second busbars 60 are respectively connected to the two second pole assemblies 50. The first battery 1 and the second battery 2 may be connected in series. In such case, one first pole assembly 20 is connected to one second pole assembly 50, and the other first pole assembly 20 is connected to the third battery; correspondingly, the other second pole assembly 50 may be connected to a fourth battery. The first battery 1 and the second battery 2 may be connected in parallel. In such case, one first pole assembly 20 is connected to one second pole assembly 50, and the other first pole assembly 20 is connected to the other second pole assembly 50. The connection relationship between the batteries of the battery apparatus is not limited here, connection in series and in parallel may be selected according to actual needs.

In one embodiment, orthographic projections of the first segment 31 and the first pole assembly 20 on a first surface 12 at least partially overlap. In other words, the first segment 31 and the first pole assembly 20 may be directly connected, and the connection is very convenient.

The orthographic projections of the third segment 61 and the second pole assembly 50 on a third surface 42 at least partially overlap. That is, the third segment 61 and the second pole assembly 50 may be directly connected, and the connection is very convenient.

Optionally, orthographic projections of the first segment 31 and the first pole assembly 20 on one first surface 12 do not overlap. That is, the first segment 31 and the pole assembly 110 may be connected by a metal connecting piece.

Orthographic projections of the third segment 61 and the second pole assembly 50 on a third surface 42 do not overlap. That is, the third segment 61 and the second pole assembly 50 may be connected by a metal connecting piece.

Figure 10:
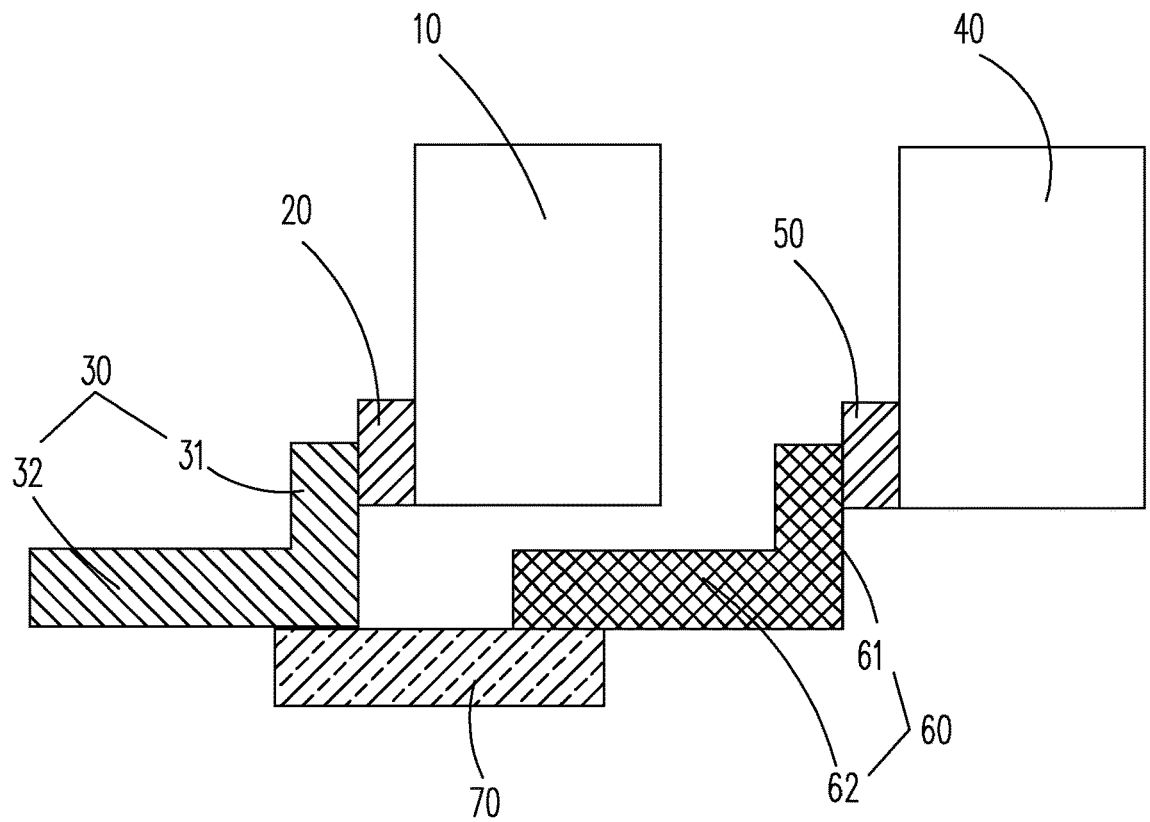
FIG. 10 is a schematic diagram showing a simplified structure of a battery apparatus according to a third exemplary embodiment.

In one embodiment, as shown in FIG. 10, the first battery body 10 includes: the cell 14, wherein the cell 14 is connected to the first pole assembly 20; and the housing 15, wherein the cell 14 is located in the housing 15. The first recess 11 and the first pole assembly 20 are both disposed on the housing 15, which is not only convenient for assembly but also has a relatively simple structure, so the housing 15 may be configured for the assembly of the first pole assembly 20.

Figure 7:
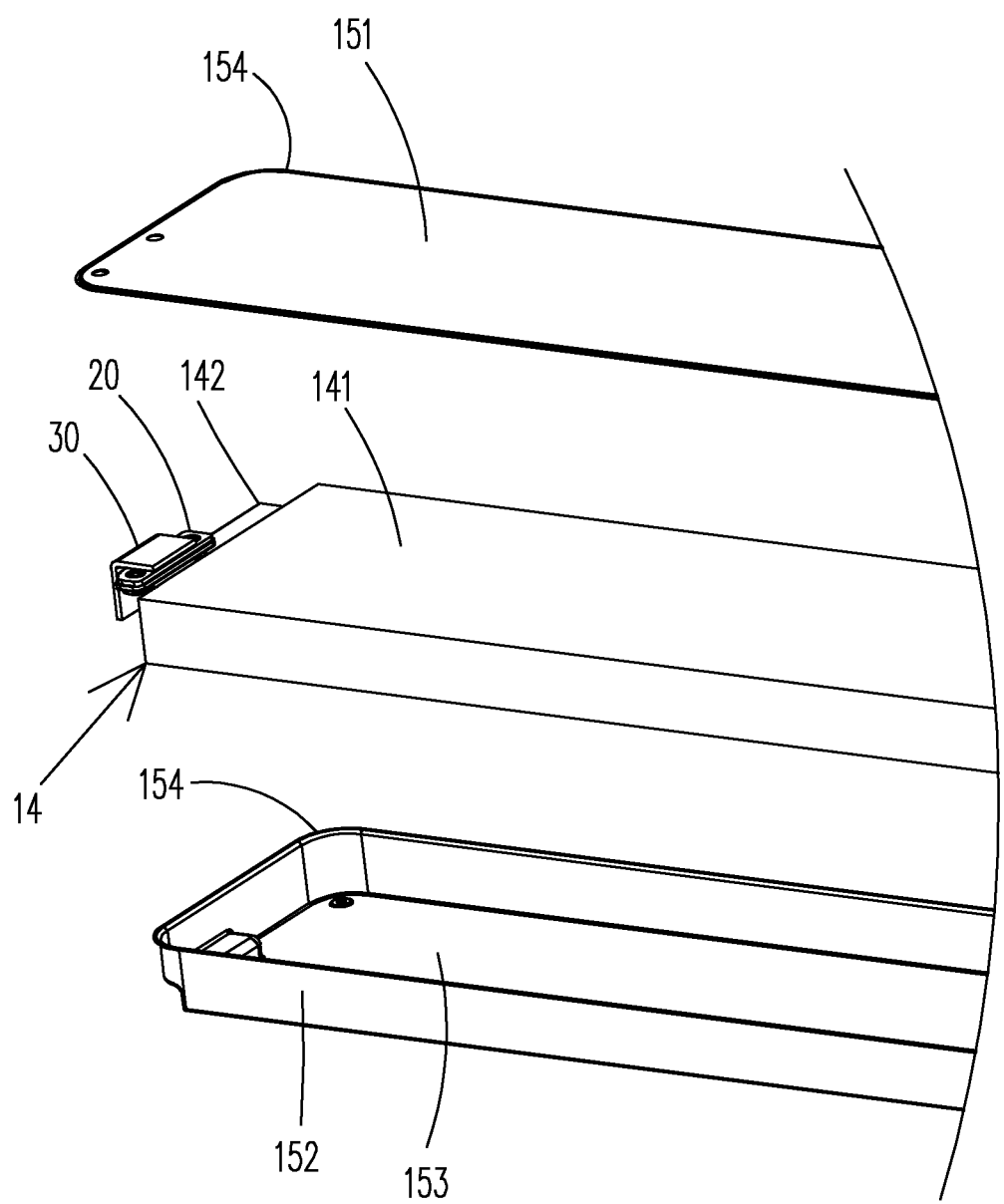
FIG. 7 is a schematic diagram showing a partial exploded structure of a first battery of a battery apparatus according to an exemplary embodiment.

In one embodiment, as shown in FIGS. 6 and 7, the housing 15 includes: the first housing 151; and the second housing 152, wherein the second housing 152 is connected to the first housing 151, so as to close the cell 14. The first housing 151 and the second housing 152 are disposed separately, which can facilitate the assembly of the cell 14 and the convenient processing.

Optionally, the first housing 151 and the second housing 152 may both be formed with an accommodating cavity 153. After the first housing 151 and the second housing 152 are butted, the cell 14 is located in the cavity formed by the two accommodating cavities 153. Depths of the accommodating cavity 153 of the first housing 151 and the second housing 152 may be the same or different; no limitation is imposed here.

Optionally, the first housing 151 is a flat plate, the second housing 152 is formed with the accommodating cavity 153, and the battery cell 14 is located in the accommodating cavity 153. The disposition of the flat plate may facilitate subsequent connections and is less difficult to process.

Further, a protruding edge 154 is disposed on the circumferential edge of the second housing 152. The first housing 151 is welded to the protruding edge 154, so as to ensure that the first housing 151 and the second housing 152 are reliably welded, thereby providing a connection stability. The disposition of the protruding edge 154 is mainly to ensure that the welding area is increased, thereby improving the stability of the welding.

Optionally, when the first housing 151 has the accommodating cavity 153, the circumferential edge of the first housing 151 may also be disposed with a protruding edge 154, and the protruding edge 154 of the first housing 151 and the protruding edge 154 of the second housing 152 are welded.

In one embodiment, as shown in FIG. 7, the cell 14 includes the cell main body 141 and the tab 142. The tab 142 extends from the length direction of the cell main body 141, wherein the tab 142 is connected to the first pole assembly 20. At this time, the first pole assembly 20 may be disposed at the end of the first battery body 10 to facilitate the connection and can fully use the space along the length direction.

It should be noted that for the structure and disposition of the second battery body 40 and the second pole assembly 50, reference may be made to the above-mentioned first pole assembly 20 and the first battery body 10; details which will not be repeated here. In some embodiments, the first battery 1 and the second battery 2 may have exactly the same structure.

It should be noted that, as shown in FIGS. 8-15, the busbar (the first busbar 30 and/or the second busbar 60) and the battery side (the second surface 13 and/or the fourth surface 43) are disposed at intervals, such that reliable electrical isolation is ensured, and that the tooling may be inserted into the gap for fixing during welding, for convenient welding. Optionally, there may be direct contact between the busbar and the side of the battery; that is, the two may be insulated by a coating.

In an embodiment, the battery apparatus may further include a third battery. The third battery may be one or at least two, and the structure of the third battery is similar or completely the same as the first battery 1 and the second battery 2; details will not be repeated here.

In one embodiment, a length of the first battery 1 is d, wherein 400 mm≤d≤2500 mm; a width of the first battery 1 is e, and a height of the first battery 1 is f, wherein 2e≤d≤50e and/or 0.5f≤e≤20f.

Optionally, a length of the second battery 2 is d, wherein 400 mm≤d≤2500 mm; a width of the second battery 2 is e, and a height of the second battery 2 is f, wherein 2e≤d≤50e and/or 0.5f≤e≤20f.

In one embodiment, the length of the first battery 1 is d, the width of the first battery 1 is e, and the height of the first battery 1 is f, 4e≤d≤7e, and/or, 3f≤e≤7f.

Optionally, a length of the second battery 2 is d, a width of the second battery 2 is e, and a height of the second battery 2 is f, wherein 4e≤d≤7e and/or 3f≤e≤7f.

In one embodiment, the first battery 1 is a laminated battery, and the second battery 2 is a laminated battery, which not only is convenient for packing, but also may be processed to obtain a longer-length battery.

It should be noted that, for the structures of the first battery 1 and the second battery 2 in this embodiment, reference may be made to the specific structure of the battery in the foregoing embodiment; details will not be repeated here.

It should be noted that the above-mentioned battery apparatus may be a battery module or a battery pack.

Optionally, the battery pack includes at least two battery apparatuses, the battery pack may also include a case, and the at least two battery apparatuses are disposed in the case. Alternatively, multiple batteries may be directly disposed in the case; that is, the packing process is cancelled.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising:
   two opposite first surfaces and four second surfaces disposed around the first surfaces, an area of each of the first surfaces larger than an area of each of the second-surfaces;
   pole assemblies, the pole assemblies disposed on one of the first surfaces; and
   busbars, each of the busbars bent into a first segment and a second segment, wherein the first segment is located at a side of the one of the first surfaces disposed with the pole assemblies and is connected to the pole assemblies, and the second segment is parallel to one of the second surfaces and is used for electrically connecting assemblies of another battery,
   wherein the first segment and the second segment form an angle between 80 degrees and 100 degrees, and
   one of the busbars on one of the pole assemblies is bent away from the one of the first surfaces, and the other one of the busbars on the other one of the pole assemblies is bent toward a direction close to the one of the first surfaces.

2. The battery according to claim 1, wherein an orthographic projection of the second segment on a plane where one of the first surfaces is located is located outside the one of the first surfaces.

3. The battery according to claim 2, wherein a number of the pole assemblies is two, and a number of the busbars is two; the busbars are connected to the pole assemblies respectively.

4. The battery according to claim 1, wherein the first segment is welded to one of the pole assemblies.

5. The battery according to claim 4, wherein a thickness of a portion of the first segment welded on the one of the pole assemblies is smaller than a thickness of the second segment.

6. The battery according to claim 1, wherein each of the busbars and each of the corresponding pole assemblies are integrally formed.

7. The battery according to claim 1, wherein orthographic projections of the first segment and the one of the pole assemblies on one of the first surfaces at least partially overlap.

8. The battery according to claim 1, wherein a length of the battery is a, a width of the battery is b, and a height of the battery is c, wherein $2b \leq a \leq 50b$, and/or $0.5c \leq b \leq 20c$; and $400 \text{ mm} \leq a \leq 2500 \text{ mm}$.

* * * * *